Nov. 8, 1938.  C. F. ROSENBLAD  2,136,153

HEAT EXCHANGER AND METHOD OF MAKING SAME

Filed April 11, 1935

Inventor
Curt F. Rosenblad
By Sommers & Young
Attys.

Patented Nov. 8, 1938

2,136,153

UNITED STATES PATENT OFFICE 2,136,153

HEAT EXCHANGER AND METHOD OF MAKING SAME

Curt Fredrik Rosenblad, Sodertalje, Sweden, assignor to Aktiebolaget Rosenblads Patenter, Stockholm, Sweden, a corporation of Sweden Application April 11, 1935, Serial No. 15,884
In Sweden April 14, 1934

3 Claims. (Cl. 29—157.3)

My present invention relates to improvements in heat-exchangers and more particularly apparatus of the kind comprising convolute plate walls arranged to provide fluid channels which are permanently closed at part or the whole of their spiral length and at one or both faces of the apparatus.

In hitherto known apparatus of this kind, closure has been effected by rolling solid metal bands to be interposed between the spiral borders or edges of the convolutions, and welding them with addition of welding material to said borders or edges. To facilitate such welding the metal bands extend either somewhat beyond or somewhat within the edges of the convolutions. Such known welding is very troublesome and laborious, the consumption of welding electrode is considerable and great skill in welding is necessary to obtain a perfect closure. Careless welding of joints of the type above referred to will cause high stresses in the material which may thereby be so deformed that the apparatus will be useless. Moreover, on account of the imperfection of said known welding, pieces of slag are likely to be embedded within the welding joint, and, when the apparatus is in operation said slag will be rapidly eaten away by rust and corrosion and pores will occur in the joints and cause leakage rendering the apparatus useless.

It is an object of the present invention to remove the drawbacks above mentioned. Another object of the invention is to provide a closure the manufacture of which will save time, and welding or brazing material, thereby considerably reducing the costs of manufacture of the apparatus of the kind referred to. The invention has further for its object to considerably facilitate the method of closing the fluid channels whereby the cost of manufacture of the closure is considerably reduced and an apparatus of the kind referred to is provided which is inexpensive and nevertheless very reliable in operation. Still further the invention has for its object to provide an inexpensive apparatus of the kind referred to that is particularly resistant to certain fluids such as sulphur dioxide and other acids. A further object of the invention is to provide an improved method of producing spiral form heat exchange apparatus by winding plates into convolute form with end closure strips between the edge portions of the plates with the edges of the closure strips flush with the edges of the plates in position to be joined by fusion of metal.

Several embodiments of the invention are illustrated by way of example in the annexed drawing.

Figure 1:
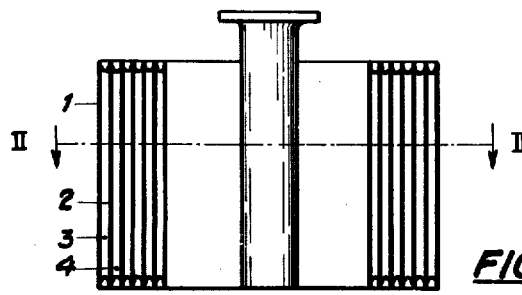
Fig. 1 is a diagrammatic longitudinal sectional view of a heat-exchanger embodying the invention.
Figure 2:
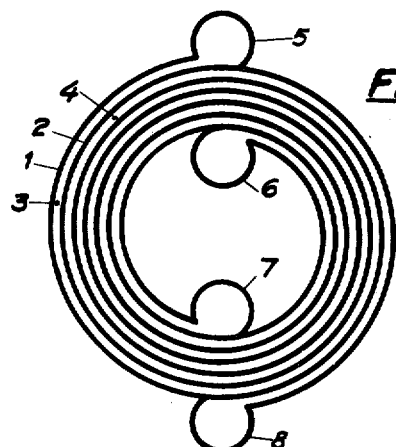
Fig. 2 is a diagrammatic sectional view on the line II—II of Fig. 1.
Figure 3:
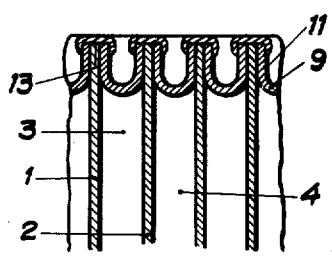

Referring to the drawing two convolute plate walls 1 and 2 are arranged to provide fluid channels 3 and 4 having outlets and inlets 5, 6, 7, and 8. Apparatus of this kind are well known in the art and therefore further description thereof will in the interest of brevity be omitted. The channels which may be completely or partly closed at one or both faces of the apparatus are according to the embodiment illustrated in Fig. 1 completely closed at both faces. For that purpose metal bands 9 as shown in Fig. 3 are arranged between the spiral borders or edges 13 of the convolute walls. The band 9 has two outwardly projecting rims or flanges 11 which tightly engage oppositely disposed convolutions and their edges extend flush with the spirally extending edges of the walls. The bands 9 have U-shaped cross sections and are positioned between the plates 2 before the winding and then wound up with said plates. The thickness of the rims or flanges 11 relative to that of the wall edges 13 is made such that when heating them, for instance by means of a flame, they will transfer about equally much heat and thus they will be fused down simultaneously, that is, they will be fused together. The fusing process can be carried out in a very simple manner, viz. by causing a heating tool to ride on the edges to be welded.

The edges and rims fused together are all relatively thin and consequently the demand of heat for fusing is inconsiderable and fusing is effected rapidly. No additional welding material is required and therefore there is no risk of embedding slag in the joints. This circumstance as well as the fact that the fusing is effected rapidly and without appreciable consumption of heat renders the structure well adapted to be manufactured of stainless or acid-proof steel such steels being sensitive to heat-treatment and difficult to weld. Thus according to the invention the apparatus will be sufficiently resistant even in case it is adapted for cooling of sulphur dioxide or the like. Obviously the structure according to the invention is particularly adapted to be sealed by fusing of the edges of the plates and sealing strip flanges. However, the properly fixed dimensions of the joints at the wall edges will facilitate even other manners of securing the bands to the wall edges. The equalized heat transfer will also give improved brazed or soldered joints or joints obtained by welding on of additional welding material.

Figure 5:
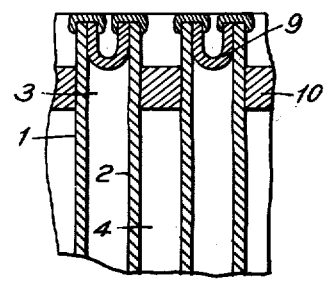

Possibly only one of the fluid channels will be permanently closed as is illustrated in Fig. 5 and this may be accomplished in the same way as described relative to Fig. 3. The channel 4 is open and fitted with distance pieces 10 serving to hold the convolutions apart.

Figure 4:
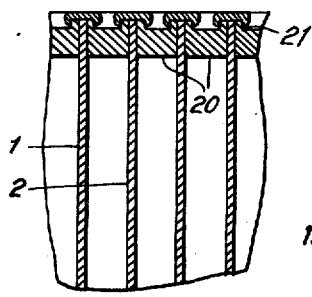
Figs. 3 to 5 are enlarged sectional views of several embodiments of the invention.

Also, as shown in Fig. 4 the bands may if desired have an interior solid part 20 of considerably greater thickness than the plates 2 from which one or two rims 21 project outwardly towards the face of the apparatus. Said solid part is particularly resistant and thus well adapted for staying and holding apart the convolute walls while the thickness of its flange or flanges is substantially equal to the thickness of the plates 2 and thus also adapted to be fused similarly as the edges of the closure strips of Figs. 3 and 5, as previously described. It will also be understood that this form of closure strip may be placed in position between the edge portions and the plates 2 with the edges of its flange or flanges flush with the edges of the plates by being wound up into convolute form together with the plates, and the thickness of the solid part between the flanges is substantially uniform so that the space between the flanges is free or open.

I claim:—

1. The method of forming heat exchange apparatus having spiral channels comprising, winding up a pair of plates and an end closure strip together with the edges of the plates maintained spaced apart by the end closure strip, said strip having outwardly extending marginal flanges of substantially equal thickness as the said plates, said strip being of substantially uniform thickness between said flanges, the strip being wound with the outer edges of said flanges substantially even with the edges of the plates, and welding the outer edges of the flanges of the closure strip to the edges of the plates by fusion welding.

2. A spiral form heat exchanger comprising spirally wound plate metal walls spaced apart to provide fluid channels therebetween and a metal band wound spirally with said plates and extending between two adjacent edge portions of said plates permanently closing the corresponding edge of one of said channels and maintaining said plates in spaced relation, said band having a solid portion of considerably greater thickness than the thickness of said plate walls spaced inwardly from the edges of the plates and having flanges of substantially equal thickness as the walls extending outwardly with their outer edges flush with the edges of said walls, the edges of said flanges and said walls being permanently joined by fusion of said edges, the thick solid portion of the band serving to maintain the plates in the desired spaced relation without crimping during the winding up of the plates and band, and the thickness of said band between said flanges being substantially uniform so that an entirely free space is left between the flanges.

3. A heat exchanger comprising convolute plate walls arranged to provide fluid channels, and a metal band wound up spirally between two adjacent edges of said walls permanently closing a channel face, said band having a solid and particularly resistant part of considerably greater thickness than said walls adapted to stay and hold apart the convolute walls, said solid part having sufficient thickness to prevent crimping and undesired deformations when being rolled up between the plates and having flanges thinner than said solid part and projecting outwardly from the edges of said solid part, said flanges having their outer edges tightly secured to said wall edges and being of substantially equal thickness and heat-conductivity to the thickness and heat-conductivity of the corresponding wall edges whereby on simultaneous heating of said wall edges and said flange edges both are fused down simultaneously, and the thickness of the solid resistant part of said flanges being substantially uniform so that a free space is left between the flanges.

CURT FREDRIK ROSENBLAD.